(12) United States Patent
Schnabel et al.

(10) Patent No.: US 9,022,512 B2
(45) Date of Patent: May 5, 2015

(54) METHOD FOR ADJUSTING THE PROCESSING POSITION OF AT LEAST ONE PROCESSING DEVICE NOT CLAMPING A PRODUCT WEB TO BE PROCESSED

(75) Inventors: Holger Schnabel, Wuerzburg (DE); Stephan Schultze, Lohr-Wombach (DE); Mario Goeb, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 13/599,959

(22) Filed: Aug. 30, 2012

(65) Prior Publication Data

US 2013/0235139 A1     Sep. 12, 2013

(30) Foreign Application Priority Data

Sep. 2, 2011  (DE) .......................... 10 2011 112 116

(51) Int. Cl.
| | | |
|---|---|---|
| *B41J 29/38* | (2006.01) | |
| *B41J 2/01* | (2006.01) | |
| *G05D 3/00* | (2006.01) | |
| *B41J 11/42* | (2006.01) | |
| *B41J 15/04* | (2006.01) | |
| *B23K 26/08* | (2014.01) | |

(52) U.S. Cl.
CPC . *G05D 3/00* (2013.01); *B41J 11/42* (2013.01); *B41J 15/04* (2013.01); *B23K 26/0869* (2013.01)

(58) Field of Classification Search
None
See application file for complete search history.

(56) References Cited

U.S. PATENT DOCUMENTS

2010/0046014 A1*  2/2010  Eun et al. ...................... 358/1.9

FOREIGN PATENT DOCUMENTS

DE     10 2010 044 645 A1     4/2011

* cited by examiner

*Primary Examiner* — Geoffrey Mruk
(74) *Attorney, Agent, or Firm* — Maginot, Moore & Beck LLP

(57) ABSTRACT

A method for adjusting the processing position of at least one processing device not clamping a product web to be processed within the context of longitudinal register control in a processing machine includes arranging the at least one processing device in a web section which is delimited by two clamping points. The method further includes applying an actuating variable for adjusting the processing position to the at least one processing device within the context of feedforward control, and calculating the actuating variable for adjusting the processing position on the basis of a register deviation expected from a control action of a tensile force control device for controlling the tensile force in the web section.

12 Claims, 3 Drawing Sheets

METHOD FOR ADJUSTING THE PROCESSING POSITION OF AT LEAST ONE PROCESSING DEVICE NOT CLAMPING A PRODUCT WEB TO BE PROCESSED

This application claims priority under 35 U.S.C. §119 to patent application no. DE 10 2011 112 116.5, filed on Sep. 2, 2011 in Germany, the disclosure of which is incorporated herein by reference in its entirety.

The present disclosure relates to a method for adjusting the processing position of at least one processing device not clamping a product web to be processed.

Although the disclosure will be described below substantially with reference to digital printing presses, it is not restricted to such an application but instead can be used in all types of processing machines in which the product web is not clamped by the processing device during the processing, that is to say, during the processing, there is substantially no contact between processing device and product web (e.g. digital printing with inkjet printing units, laser processing of a product web, etc.). In the sense of the disclosure, no clamping ever takes place when a change in the processing position of the processing device leads to no substantial change in the product web speed. Thus, the method according to the disclosure can also be used, for example, in screen printing and other printing processes which do not form any clamping point with the product web.

BACKGROUND

There exist numerous applications from the applicant which relate to longitudinal register control in processing machines, in which the processing devices are implemented as clamping points and there is therefore coupling between longitudinal register and web tensile force. In this case, a correction to the processing position always also leads to a change in speed of the product web and therefore to a change in the tensile force and vice versa.

However, no solutions exist for the non-contact case forming the basis here, in which in particular no speed change occurs as a result of longitudinal register control. However, a change in speed occurs in the event of a change in the web tensile force without the processing position being changed at the same time. The known methods for avoiding longitudinal register errors cannot be applied here.

It is therefore desirable to specify a method with which a register deviation as a result of a tensile force change can be kept as low as possible or eliminated.

SUMMARY

According to the disclosure, a method is proposed for adjusting the processing position of at least one processing device not clamping a product web to be clamped.

The disclosure is advantageously implemented within the context of feedforward control. Since control in the closed control loop can only react to disturbances, a register error (i.e. an erroneous processing position) must occur first before it can be controlled out. Feedforward control, on the other hand, makes it possible that a register error does not occur at all. This is advantageous in particular given the ever increasing requirements with regard to accuracy, above all in relation to printed electronics. Within the context of the disclosure, a method has been developed with which a register deviation to be expected can be calculated on the basis of known process variables, so that the disclosure can be implemented particularly simply.

A computing unit according to the disclosure, for example a control device of a printing press, is equipped, in particular by programming, to carry out a method according to the disclosure.

In addition, the implementation of the disclosure in the form of software is advantageous, since this permits particularly low costs, in particular if an executing computing unit is also used for further tasks and is therefore present in any case. Suitable data storage media for providing the computer program are in particular floppy disks, hard drives, flash memories, EEPROMs, CD-ROMs, DVDs and various others. In addition, downloading a program via computer networks (Internet, Intranet and so on) is possible.

Further advantages and refinements of the disclosure can be gathered from the description and the appended drawing.

The features cited above and those still to be explained below can be used not only in the respectively specified combination but also in other combinations or on their own without departing from the scope of the present disclosure.

The disclosure is illustrated schematically in the drawing by using exemplary embodiments and will be described extensively below with reference to the drawing.

DETAILED DESCRIPTION

Figure 1:
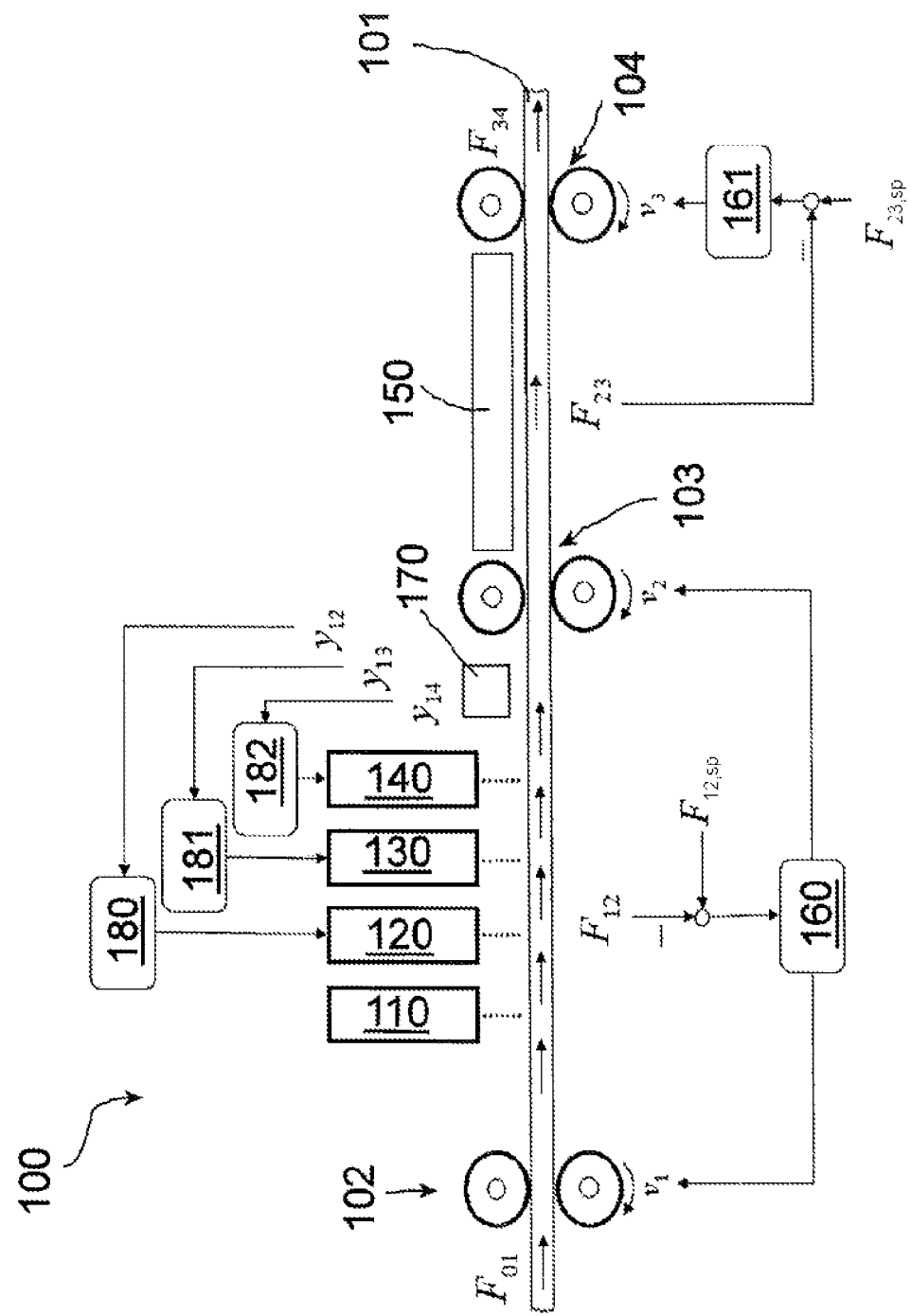
FIG. 1 shows a processing machine operating without contact and constructed as a digital printing press, as can form the basis of the disclosure.

In FIG. 1, a processing machine 100, as can form the basis of the present disclosure, is shown schematically. The processing machine 100 is constructed as a digital printing press having four digital printing units 110, 120, 130 and 140 for a four-color print. The digital printing units operate without contact, in the present example via an inkjet printing process.

A product web 101 is transported through the printing press by driven transport devices 102, 103, 104. The transport devices are clamping points, i.e. the product web 101 is clamped in between them. The transport device 102 is driven at a speed $v_1$, the transport device 103 is driven at a speed $v_2$, and the transport device 104 is driven at the speed $v_3$. As a result, tensile forces $F_{01}$, $F_{12}$, $F_{23}$ and $F_{34}$ form in the product web between the transport devices. In order to control the tensile forces $F_{12}$ and $F_{23}$ (in the closed control loop), two tensile force control devices 160 and 161 are provided, which, by means of appropriately changing the speeds $v_1$, $v_2$ and $v_3$, adjust the actual tensile forces $F_{12}$ and $F_{23}$ to tensile force set points $F_{12,sp}$ and $F_{23,sp}$. The actual tensile forces can be measured, for example by force transducers or via the drive torques on the transport devices. This is sufficiently well known in the prior art. The tensile force control devices 160 and 161 are normally implemented in a common computing unit, what is known as the tensile force controller.

In order to control the longitudinal register (i.e. the relative processing positions in the material flow direction) (in the closed control loop), longitudinal register control devices 180, 181 and 182 are provided, which correct the processing positions of the digital printing units 120, 130 and 140 in the material flow direction on the basis of measured register deviations $y_{12}$ (i.e. deviation of the register position between the printing unit 110 and 120), $y_{13}$ (i.e. deviation of the register position between the printing unit 110 and 130) and $y_{14}$ (i.e. deviation of the register position between the printing unit 110 and 140), in order to align them relative to the processing position of the digital printing unit 110. Likewise, other reference color control is possible, such as control of the register deviations $y_{14}, y_{24}$ and $y_{34}$ (digital printing unit 140 is the reference printing unit, in this case the longitudinal register controller 182 would correct the digital printing unit 110). Furthermore, measuring and controlling the register would also be possible as predecessor color control, i.e. control of the registers $y_{12}, y_{23}, y_{34}$.

In order to measure the register deviations $y_{12}$ and/or the processing positions, one or more appropriate sensors 170 (for example (ink) mark sensor, camera) are provided, which, for example, detect printed register marks. This is sufficiently well known in the prior art. For the purpose of register correction, the longitudinal register control device 180 shifts the processing position of the printing unit 120, the longitudinal register control device 181 shifts the processing position of the printing unit 130, and the longitudinal register control device 182 shifts the processing position of the printing unit 103 in a manner sufficiently well known in the prior art. The intention is to achieve the situation where the individual images printed by the printing units lie correctly over one another. The longitudinal register control devices 180, 181 and 182 are often implemented in a common computing unit, what is known as the register controller. The register controller can, for example, also be implemented in the sensor 170.

Tensile force controllers and register controllers can also be implemented in a common computing unit.

Between the transport devices 103 and 104 there is, for example, a dryer 150 for drying the ink sprayed on.

In order to describe the disclosure, reference is made below to the web section having the tensile force $F_{12}$. The web tensile force can be controlled by means of control actions on the front transport device 102 and/or on the rear transport device 103. As a control action here, a fine adjustment (corresponds to a change in the transmission ratio between drive—normally electric motor—and transport device and therefore a percentage speed change) is normally made, which leads to a change in the speed on the transport device selected.

If the tensile force controller performs an adjustment, then the speed of at least one of the two clamping points is changed. This leads to a change in the speed profile under the printing units, which in turn has an effect on the longitudinal register and leads to rejects. In order to avoid the rejects, within the context of the disclosure the individual printing units 120, 130, 140 are controlled in advance such that a change in the speed profile does not lead to a change in the register. As opposed to clamping printing units, non-clamping printing units can be adjusted without this having any influence on the speed of the product web.

Figure 2:
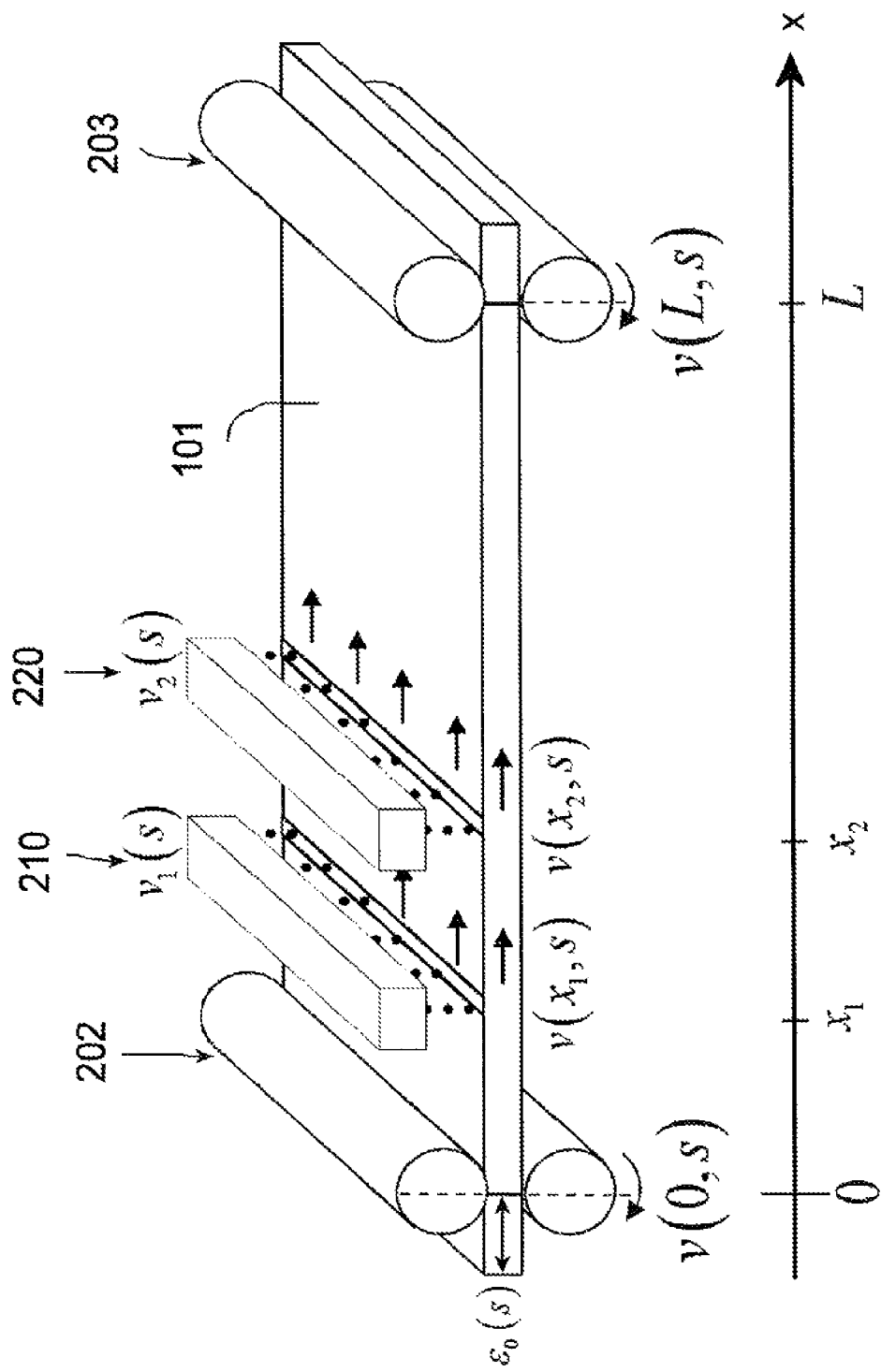
FIG. 2 shows a detail of a processing machine having two non-clamping processing devices as a starting point for determining product web speeds.

In the following text, with reference to FIG. 2, it will be explained how a speed adjustment acts on the register. FIG. 2 shows a web section which is delimited by two clamping points 202, 203 having the speed $v(0,s)$ and $v(L,s)$, respectively. The length of the product web 101 to between the clamping points is L. The product web runs into the web section considered with a stretch $e_0(s)$.

Furthermore, two printing units 210, 220 are located at the positions $x_1$ and $x_2$, respectively. The distance between the printing units is $x_2-x_1$. The two printing units spray ink onto the product web Immediately under the printing units, the product web 101 has a web speed of $v(x_1,s)$ and $v(x_2,s)$. The processing speed is $v_1(s)$ and $v_2(s)$, respectively; this is defined substantially by the time interval between two printed lines.

In the case of non-clamping printing units, a coinciding product web speed and processing speed is not given per se. Instead, irrespective of the processing speed, in the case of a purely elastic product web behavior—without climatic dependencies—the location-dependent and time-dependent speed of a free product web is given by the following description:

$$v(x, s) = \frac{s \cdot \frac{L-x}{\overline{v}}}{1+s \cdot \frac{L}{\overline{v}}} \cdot (v(0,s) - \overline{v} \cdot \varepsilon_0(s)) + \frac{1+s \cdot \frac{x}{\overline{v}}}{1+s \cdot \frac{L}{\overline{v}}} \cdot v(L,s)$$

From a combination of the linear stretch behavior of the product web with known equations relating to the register error, depending on the circumferential speeds of the delimiting clamping points $v(0,s)$ and $v(L,s)$, the stretch $e_0(s)$ running into the web section (this results, for example, from tensile force and cross section), and the processing speeds $v_1(s)$ and $v_2(s)$, the register error y in the case of non-clamping printing units is given by:

$$y_{x_1 x_2}(s) = \frac{1}{s} \cdot \left( v_1(s) - \frac{1+s \cdot \frac{L-x_1}{\overline{v}}}{1+s \cdot \frac{L}{\overline{v}}} \cdot (v(0,s) - \overline{v} \cdot \varepsilon_0(s)) - \frac{s \cdot \frac{x_1}{\overline{v}}}{1+s \cdot \frac{L}{\overline{v}}} \cdot v(L,s) \right) \cdot$$

$$e^{-\frac{x_2-x_1}{\overline{v}} s} -$$

$$\frac{1}{s} \cdot \left( v_2(s) - \frac{1+s \cdot \frac{L-x_2}{\overline{v}}}{1+s \cdot \frac{L}{\overline{v}}} \cdot (v(0,s) - \overline{v} \cdot \varepsilon_0(s)) - \frac{s \cdot \frac{x_2}{\overline{v}}}{1+s \cdot \frac{L}{\overline{v}}} \cdot v(L,s) \right)$$

With regard to further details relating to the derivation, reference should be made to the publication "Bahnzugkraft-und Registerkorrelation bei Maschinen mit Non Impact Printing" [Web tensile force and register correlation in machines with non impact printing], M. Göb, H. Schnabel, S. Schultze, SPS/IPC/DRIVES 2011, Nuremberg.

Figure 3:
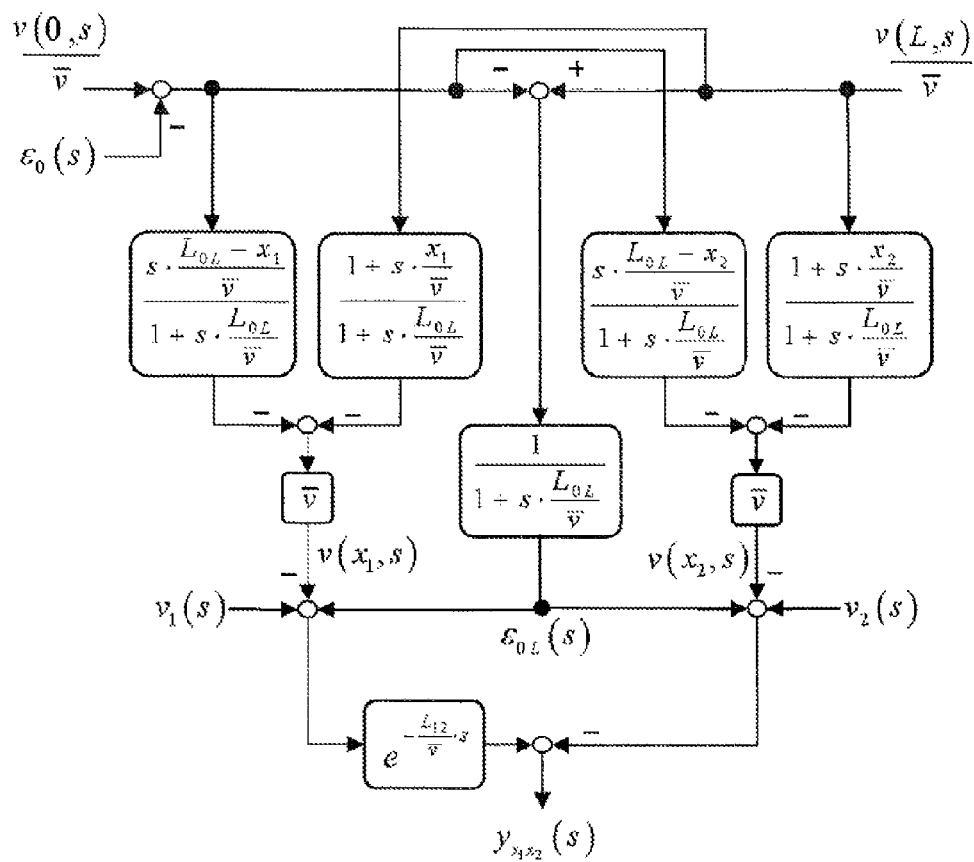
FIG. 3 shows a schematic drawing relating to calculating a register deviation resulting from process variables.

This results in the relationship illustrated schematically in FIG. 3, from which a resultant register deviation $y_{x1,x2}$ can be determined, i.e. a distance by which the printed image from the printing unit at the position $x_1$ has been shifted relative to the printed image from the printing unit at the position $x_2$. $L_{0L}$ designates the length L, $L_{12}$ the distance between $x_1$ and $x_2$, and $\overline{v}$ an unchanged speed (corresponding to a "constant component" of the speed and of the unchanged master shaft speed).

In order then to avoid this register deviation within the context of the disclosure, for example the printing unit at the position $x_2$ is controlled in advance such that the processing position thereof is adjusted by the register error $\Delta x=y_{x1,x2}$ to be expected. In a simple embodiment, this can be carried out by the print being offset by a certain time (earlier or later). As a result, the printing position (processing position) on the product web is changed, for example by the desired distance $\Delta x$.

It can be seen that the register error $y_{x1,x2}$ can be calculated on the basis of the variables $v_1(s), v_2(s), v(0,s), v(L,s)$ and $e_0(s)$, which are normally known in the machine control system or at least can easily be determined. Furthermore, the register error depends on the positions $x_1$ and $x_2$ and the free product web length L between the clamping points. As a rule, these variables are constant in the printing process and likewise easily determinable. The feedforward control according to the disclosure can therefore be implemented particularly easily.

According to a particularly preferred embodiment of the disclosure, the following steps are carried out.

Within the context of normal machine operation, there are control actions in the tensile force controller in order to control the actual tensile force to a predefined tensile force set point. To this end, the web tensile force controller calculates an actuating variable, for example a fine adjustment, with which the speed of the upstream and/or downstream transport device is changed.

One cause of a change in the tensile force is, for example, a change in the modulus of elasticity. This can be brought about by a change in the amount of damping solution introduced, for example on account of a change in printed image, including on-the-fly.

The speed change of the selected transport device is taken into account and the resultant register error is calculated for the respective printing units, preferably in accordance with the analytical model illustrated above. It has been shown that the selection of the upstream transport device is advantageous since, if the incoming clamping point is shifted, only one dynamic control error occurs, which is self-compensating (i.e. reduces itself).

The calculated expected register error is connected additively and inversely as feedforward control to the respective printing units, which means that an actual occurrence of the register error is counteracted. The actuating variable fed forward can be a distance $\Delta x$ by which the printing image to be applied is shifted. This information can be transmitted via any desired bus (e.g. Ethernet) or via a real-time bus (e.g. Sercos 3). Furthermore, the printing image can be shifted via an encoder emulation. In digital printing units, it is usual for the drive of the printing nozzles to be controlled by using a highly accurate machine speed/machine angle (e.g. master shaft position). The transmission of the machine speed is read, for example in the prior art, by the printing unit drive by means of incremental encoder signals (via encoders mounted on a transport device of the machine or via an encoder signal emulated on the basis of a machine angle). If, for example, the emulated machine angle which is transmitted to a first printing unit 210 is shifted by an angle with respect to the emulated machine angle which is transmitted to a second printing unit 220, the result is a shift in the printed images on the product web. Furthermore, the encoder information—as disclosed in DE 10 2010 044 645—can be transmitted via a real-time bus. Alternatively, it is also possible for the feedforward control (outputs from the controllers 180, 181, 182) to be carried out not by shifting a transmitted machine position but by transmitting an additive printing unit angle to be fed forward via a standard communication system, such as an Ethernet link, between a machine control system and the digital printing unit drive.

The method then begins from the beginning again.

A preferred development of the disclosure also includes changing the length of the printing image, in addition to changing the position. A change in the product web speed at the location of a printing unit leads to the image to be applied having to be applied in a shorter or longer time if the printed length is not to change. For this reason, a change in the speed profile (on account of a tensile force control action, for example in reaction to a changing modulus of elasticity and, resulting from the latter, a change in speed of one of the clamping points) has an effect on the length of the printed image. As has been explained above, the product web speed resulting therefrom at the location of the printing unit is determinable, so that the printed length change to be expected can be determined. This printed length change can also be counteracted by driving the printing unit, for example by influencing the time interval between two printed lines. This can likewise be transmitted via any desired bus (e.g. Ethernet) or via a real-time bus (e.g. Sercos 3). Furthermore, the printing image can be shifted via an encoder emulation.

What is claimed is:

1. A method for adjusting the processing position of at least one processing device not clamping a product web to be processed within the context of longitudinal register control in a processing machine, comprising:
   arranging the at least one processing device in a web section which is delimited by two clamping points;
   calculating an expected register deviation that will result from a control action of a tensile force control device for controlling the tensile force in the web section;
   calculating an actuating variable for adjusting the processing position on the basis of the expected register deviation resulting from a control action of a tensile force control device for controlling the tensile force in the web section; and
   applying the actuating variable as a feedforward control to the at least one processing device.

2. The method according to claim 1, wherein the actuating variable is calculated from a speed of the two clamping points and a stretch of the product web.

3. The method according to claim 1, wherein the actuating variable is calculated from a speed of the at least one processing device.

4. The method according to claim 1, wherein the actuating variable is calculated from positions of the at least one processing device and the two clamping points.

5. The method according to claim 1, wherein the actuating variable is applied to the at least one processing device in order to shift the processing position by a distance which corresponds to the expected register deviation.

6. The method according to claim 1, further comprising:
   adjusting a processing length of the at least one processing device; and
   applying an actuating variable for adjusting the processing length to the at least one processing device within the context of feedforward control,
   wherein the actuating variable for adjusting the processing length is calculated from an expected speed change from a control action of a tensile force control device for controlling the tensile force in the web section.

7. The method according to claim 1, wherein the actuating variable is transmitted to the at least one processing device via a bus connection.

8. The method according to claim 1, wherein the actuating variable is generated as an output from an encoder emulation.

9. The method according to claim 1, wherein feedforward control is carried out when a process variable changes.

10. The method according to claim 1, wherein:
   the processing machine is a digital printing press including at least one inkjet printing unit, and
   the at least one inkjet printing unit is the processing device.

11. The method according to claim 1, wherein the processing machine includes at least one laser processing device.

12. The method according to claim 1, wherein a computing unit is equipped to carry out the method.

\* \* \* \* \*